(12) United States Patent
Wakabayashi et al.

(10) Patent No.: US 11,071,084 B2
(45) Date of Patent: Jul. 20, 2021

(54) TERMINAL DEVICE, INFRASTRUCTURE EQUIPMENTS AND METHODS

(71) Applicants: Sony Corporation, Tokyo (JP); Sony Mobile Communications Inc., Tokyo (JP)

(72) Inventors: Hideji Wakabayashi, Basingstoke (GB); Anders Berggren, Basingstoke (GB); Yuxin Wei, Basingstoke (GB); Vivek Sharma, Basingstoke (GB); Shinichiro Tsuda, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/768,077

(22) PCT Filed: Nov. 28, 2018

(86) PCT No.: PCT/EP2018/082894
§ 371 (c)(1),
(2) Date: May 29, 2020

(87) PCT Pub. No.: WO2019/106045
PCT Pub. Date: Jun. 6, 2019

(65) Prior Publication Data
US 2020/0314795 A1  Oct. 1, 2020

(30) Foreign Application Priority Data
Nov. 30, 2017 (EP) .................................. 17204751

(51) Int. Cl.
*H04W 24/00* (2009.01)
*H04W 64/00* (2009.01)
(Continued)

(52) U.S. Cl.
CPC ........... *H04W 64/006* (2013.01); *H04W 4/20* (2013.01); *H04W 68/00* (2013.01)

(58) Field of Classification Search
CPC ................. H04W 24/04; H04W 4/023; H04W 12/00503; H04W 4/02; H04W 4/021;
(Continued)

(56) References Cited

U.S. PATENT DOCUMENTS

2011/0306362 A1* 12/2011 Huang .................... G01S 19/05
455/456.1

FOREIGN PATENT DOCUMENTS

| EP | 2389022 A1 | 11/2011 |
|----|-----------|---------|
| WO | 02/067462 A1 | 8/2002 |
| WO | 2019/086309 A1 | 5/2019 |

OTHER PUBLICATIONS

International Search Report and Written Opinion dated May 7, 2019 for PCT/EP2018/082894 filed on Nov. 28, 2018, 20 pages.
(Continued)

*Primary Examiner* — Gary Lafontant
(74) *Attorney, Agent, or Firm* — Xsensus LLP

(57) ABSTRACT

A terminal device configured to receive a radio signal from which measurements can be used to assist in determining a position of the terminal device. The terminal device detects one or more system information blocks carrying position assistance information transmitted from the infrastructure equipment and estimates the position of the terminal device by combining the identified position assistance information with the radio signal received by the position detection receiver circuitry. Furthermore the terminal device receives from the infrastructure equipment an indication of relative risk that the position assistance information will change, and in response to the indication of the relative risk that the position assistance information will change to adapt the receiving of the one or more system information blocks to
(Continued)

receive an updated version of the position assistance information in accordance with the relative risk.

19 Claims, 7 Drawing Sheets

(51) Int. Cl.
    *H04W 4/20*     (2018.01)
    *H04W 68/00*     (2009.01)
(58) Field of Classification Search
    CPC ....... H04W 4/029; H04W 64/00; H04W 8/00;
              H04W 64/003; H04Q 2209/40; H04M
              1/72572; H04M 2207/18; H04L 43/50;
              H04L 1/24; H04L 63/10; G01S 5/0242;
              G01S 5/20; G06Q 20/10; G06Q 30/02;
                G06Q 30/0207; G06Q 50/22; G06Q
                            2220/00; G08C 17/02
    See application file for complete search history.

(56) References Cited

OTHER PUBLICATIONS

3GPP, "3rd Generation Partnership Project; Technical Specification Group Services and System Aspects; Earthquake and Tsunami Warning System (ETWS) Requirements and Solutions; Solution Placeholder," TR 23.828, Version 8.0.0, Release 8, Sep. 2008, pp. 1-22.
3GPP, "Digital cellular telecommunications system (Phase 2+); Universal Mobile Telecommunications System Technical realization of the Short Message Service (SMS)," TS 23.040, Version 9.3.0, Release 9, Oct. 2010, pp. 1-203.
3GPP, "LTE; Evolved Universal Terrestrial Radio Access Network (E-UTRAN); Stage 2 functional specification of User Equipment (UE) positioning in E-UTRAN," TS 36.305, Version 10.0.0, Release 10, Jan. 2011, pp. 1-52.
3GPP, "Digital cellular telecommunications system (Phase 2+); Universal Mobile Telecommunications System (UMTS); Numbering, addressing and identification," TS 23.003, Version 10.5.0, Release 10, Apr. 2012, pp. 1-82.
3GPP, "Digital cellular telecommunications system (Phase 2+); Universal Mobile Telecommunications System Technical realization of Cell Broadcast Service (CBS)," TS 23.041, Version 9.4.0, Release 9, Jun. 2010, pp. 1-46.
3GPP, "Digital cellular telecommunications system (Phase 2+); Universal Mobile Telecommunications System (UMTS); LTE; Functional stage 2 description of Location Services (LCS)," TS 23.271, Version 10.4.0, Release 10, Apr. 2013, pp. 1-170.
3GPP, "LTE; Evolved Universal Terrestrial Radio Access (E-UTRA); User Equipment (UE) procedures in idle mode," TS 36304, Version 12.2.0, Release 12, Sep. 2014, pp. 1-38.
3GPP, "LTE; Evolved Universal Terrestrial Radio Access (E-UTRA); Radio Resource Control (RRC); Protocol specification," TS 36.331, Version 13.0.0, Release 10, Jan. 2016, pp. 1-669.
Qualcomm and LG Electronics, "Miscellaneous correction to TS 36.331 related to eDRX," 3GPP TSG-RAN WG1 Meeting #93, R2-162015, St. Julian's, Malta, Feb. 15-19, 2016, 13 pages.
3GPP, "LTE; Evolved Universal Terrestrial Radio Access (E-UTRA); LTE Positioning Protocol (LPP)," TS 36.355 version 13.3.0, Release 13, Feb. 2017, pp. 1-142.
3GPP, "LTE; Evolved Universal Terrestrial Radio Access (E-UTRA); Multiplexing and channel coding," TS 36.212, Version 14.2.0, Release 14, Apr. 2017, pp. 1-205.
3GPP, "LTE; Technical Specification Group Radio Access Network; Evolved Universal Terrestrial Radio Access (E-UTRA); Radio Resource Control (RRC); Protocol Specification," TS 36.331, Version 14.4.0, Release 14, Sep. 2017, pp. 38-56.
Samsung, "System Information Update in NR," 3GPP TSG-RAN WG2 #99bis, R2-1710094, Resubmission of R2-1707676, Prague, Czech Republic, Oct. 9-13, 2017, 5 pages.
Qualcomm, "Broadcast of Positioning Assistance Data," 3GPP TSG-RAN WG2 Meeting #99bis, R2-1711042, Revision of R2-1708539, Prague, Czech Republic, Oct. 9-13, 2017, pp. 1-7.
5G, "The Mobile Broadband Standard," 3GPP Specification Series, 36, 6 pages, [Retrieved on May 22, 2020] Retrieved from the Internet<https://www.3GPP.org/DynaReport/36-series.htm>.
5G, "The Mobile Broadband Standard," 3GPP Specification Series, 38, 3 pages, [Retrieved on May 22, 2020] Retrieved rom the Internet: <https://www.3GPP.org/DynaReport/38-series.htm>.
Lu, H., et al., "An Supl-Based Location Platform Implementation in Mobile Network," Proceedings of ICCTA, 2009, pp. 284-287.

\* cited by examiner

ETWS notification in conventional LTE (a prior art)

the flowchart of SI change notification operations according to the degree of an unexpected event risk.

TERMINAL DEVICE, INFRASTRUCTURE EQUIPMENTS AND METHODS

CROSS-REFERENCE TO RELATED APPLICATIONS

The present application is based on PCT filing PCT/EP2018/082894, filed Nov. 28, 2018, which claims priority to EP 17204751.6, filed Nov. 30, 2017, the entire contents of each are incorporated herein by reference.

BACKGROUND

Field of the Disclosure

The present technique relates to terminal devices which are configured to generate an estimate of a location of the terminal devices. The present technique also relates to infrastructure equipment and methods, which are configured to provide position assistance information which is used by communications terminals to generate an estimate of their location.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Third and fourth generation mobile telecommunication systems, such as those based on the 3GPP ($3^{rd}$ Generation Partnership Project) defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices than current systems are optimized to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things" (IoT), and may typically be associated with the transmissions of relatively small amounts of data with relatively high latency tolerance. Low complexity devices are also often low power devices, in which it is desirable for such devices to have a low power consumption (and therefore a long battery life).

Future wireless communications networks will be expected to routinely and efficiently support location based services with a wider range of devices/applications than current systems are optimized to support.

For example, it is expected that wireless communications in 5G will support geo-fencing services such as child location services, mobile coupons/advertisements which are triggered near a shop and airport automatic check-in at the gate/counter. These applications require continuous tracking of UE position or monitoring the equivalent trigger conditions with low UE power consumption.

In view of this there is expected to be a desire for future wireless communications networks, for example those which may be referred to as 5G ($5^{th}$ Generation) or new radio (NR) system/new radio access technology (RAT) systems, as well as future iterations/releases of existing systems, to efficiently support connectivity for a wide range of devices. In particular, the problem of how to efficiently transmit signals to and receive signals from low complexity devices whilst keeping the power consumption of such devices low needs to be addressed. Configuring terminal device to provide location based services reliably and with low power consumption is therefore a technical problem.

SUMMARY

The present technique is defined according to the claims. According to an example embodiment of the present technique a terminal device comprises wireless communications receiver circuitry configured to receive signals from the infrastructure equipment via a wireless access interface provided by the infrastructure equipment, position detection receiver circuitry configured to receive a radio signal from which measurements can be used to assist in determining a position of the terminal device, and controller circuitry. The controller circuitry is configured to control the wireless communications receiver circuitry to detect one or more system information blocks carrying position assistance information transmitted from the infrastructure equipment, the position assistance information providing information which can be used to assist in determining the position of terminal device, and to control the position detection circuitry to estimate the position of the terminal device by combining the identified position assistance information with the radio signal received by the position detection receiver circuitry. Furthermore the controller circuitry is configured with the wireless communications receiver circuitry to receive from the infrastructure equipment an indication of relative risk that the position assistance information will change, and in response to the indication of the relative risk that the position assistance information will change to adapt the receiving of the one or more system information blocks to receive an updated version of the position assistance information in accordance with the relative risk. The receiving can be adapted for example by changing a period of a discontinuous reception so that if there is a relatively low risk of a change in the position assistance information, UEs can be configured to adopt a longer discontinuous reception (DRX) cycle thereby reducing power consumption. The UEs can adopt a shorter DRX cycle, when there is a greater relative risk of a change in the position assistance information so that the UEs can react more quickly to receive updated position assistance information. As a result the UEs can estimate their position more reliably.

According to another example embodiment the receiving can be adapted by receiving a paging message indicating that the position assistance information has changed.

Embodiment of the present technique can find application with advanced position or location detection techniques which include applications such as machine control, autonomous driving etc. It is expected that in future, position location detection can improve the accuracy of position detection from tens of metres to sub-metre level. For example GPS may be enhanced with GNSS technology improving the accuracy of the position or location detection to less than a metre. As such more critical location applications may be used, such as driverless cars, but these may in turn may cause more severe consequences if there are errors in position accuracy. Embodiments of the present technique can therefore provide improvements in delivering position assistance information to terminal devices to have errors in position detection can be reduced and possible consequences of these errors avoided.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

As mentioned above the embodiments of the present invention can find application with advanced wireless communications systems such as those referred to as LTE, 5G or New Radio Access Technology). New Radio Access Technology has been proposed in [2] to develop a new Radio Access Technology (RAT) for the next generation wireless communication system, i.e. 5G. The new RAT is expected to operate in a large range of frequencies, from hundreds of MHz to 100 GHz and it is expected to cover a broad range of use cases. The use cases that are considered can include:
Enhanced Mobile Broadband (eMBB)
Massive Machine Type Communications (mMTC)
Ultra Reliable & Low Latency Communications (URLLC)

Figure 1:
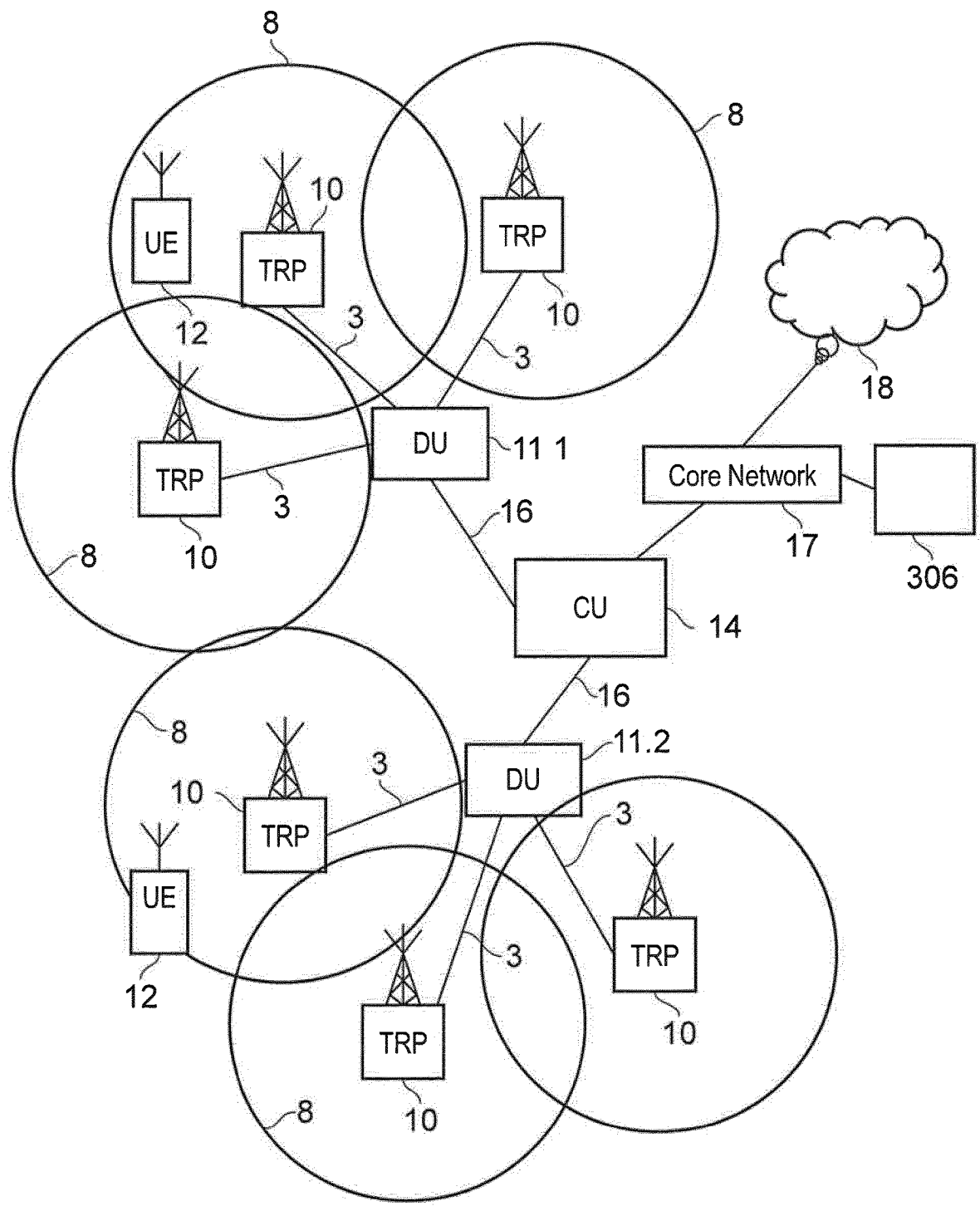
FIG. 1 is a schematic block diagram illustrating some basic functionality of a wireless communications system according to a 3GPP standard.

The aim of 5G is not only mobile connectivity for people, but to provide ubiquitous connectivity for any type of device and any type of application that would benefit from being connected. Many requirements and use-cases are still being discussed, but amongst those are:
Low latency
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility An example configuration of a wireless communications network which uses some of the terminology proposed for NR and 5G is shown in FIG. 1. In FIG. 1 a plurality of transmission and reception points (TRP) 10 are connected to distributed control units (DU) 11.1, 11.2 by a connection interface represented as a line 3. Each of the transmitter receiver points (TRP) 10 is arranged to transmit and receive signals via a wireless access interface within a radio frequency bandwidth available to the wireless communications network. Thus within a range for performing radio communications via the wireless access interface, each of the TRP 10, forms a cell of the wireless communications network as represented by a dashed line 8. As such wireless communications devices 12 which are within a radio communications range provided by the cells 10 can transmit and receive signals to and from the TRP 10 via the wireless access interface. Each of the distributed control units 11.1, 11.2 are connected to a co-ordinating unit (CU) 14 via an interface 16. The CU 14 is then connected to the a core network 17 which may contain all other functions required for communicating data to and from the wireless communications devices and the core network 17 may be connected to other networks 18.

The elements of the wireless access network shown in FIG. 1 may operate in a similar way to corresponding elements of an LTE network well-known and defined in the relevant standards administered by the 3GPP® body, and also described in many books on the subject, for example, Holma H. and Toskala A [1]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The transceiver processors TRP 10 of FIG. 1 may in part have a corresponding functionality to a base station or eNodeB of an LTE network, and so the terms TRP and eNodeB in the following description are interchangeable. Base stations, which are an example of radio network infrastructure equipment, may also be referred to as transceiver stations/NodeBs/eNodeBs (eNBs), and so forth. Similarly the communications devices 12 may have a functionality corresponding to devices know for operation with an LTE network and may also be referred to as mobile stations, user equipment (UE), user terminal, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

As shown in FIG. 1, attached to the core network 1 is a location server 306. Embodiments of the present technique for application in navigation or location based services, which require that a UE generate an estimate of its geographic location. As will be explained with reference to FIG. 2, it is known to provide a location server to generate position assistance information which assists the UE to identify its location in combination with other measurements generated from received radio signals.

Compared to existing solutions for positioning (such as those proposed by 3GPP) it is desirable to provide improved positioning arrangements. The term "positioning" should be understood to refer to any process by which a UE determines its position in space (in particular, its geographical position).

The following embodiments relate primarily to 5G (NR) positioning enhancements. However, it will be appreciate that the teachings provided may be applicable for LTE systems (e.g. LTE systems which support on-demand SI or similar, as may be available in the near future). The present technique may provide at least some of the above-mentioned improvements for both suitable LTE and NR systems.

An example of on-demand system information (SI) which may be used with embodiments of the present technique may be found in European patent application EP 16180858.9, for example.

Furthermore, information regarding existing 3GPP location based service and protocols may be found in the following white paper: LTE Location Based Services Technology Introduction (Rohde & Schwarz) http://www.rohde-schwarz-wireless.com/documents/LTELBSWhitePaper_RohdeSchwarz.pdf, the contents of which are incorporated herein by reference.

Supported versions of UE positioning methods in LPP are disclosed in 3GPP TS36.305, for example, the contents of which are incorporated herein by reference.

In 3GPP, when a UE determines its spatial position, the measurement of signals (from GNSS satellites or the like) and the calculation of the UEs position based on those signals are distinguished. "UE-assistance positioning" refers to a situation in which a device external to the UE (such as a location server of a network to which the UE is connected) calculates the position of the UE according to the report of measurement results from the UE. The present technique, on the other hand, allows more "UE-based positioning", in which the UE is provided with sufficient information to calculate its position. In other words (as described in 3GPP TS 36.305 V13.0.0 (December 2015)), the suffixes "-based" and "-assisted" refer respectively to the node that is responsible for making the positioning calculation (and which may also provide measurements) and a node that provides measurements (but which does not make the positioning calculation). Thus, an operation in which measurements are provided by the UE to the E-SMLC (Evolved Serving Mobile Location Centre) to be used in the computation of a position estimate is described as "UE-assisted" (and could also be called "E-SMLC-based"), while one in which the UE computes its own position is described as "UE-based". UE-based positioning (as used with the present technique) requires less communication with the network compared to UE-assistance positioning, thus reducing the power consumption at the UE.

As previously mentioned, UE positioning may be carried out based on signals received from GNSS satellites. As discussed in https://www.gsa.europa.eu/system/files/reports/gnss_mr_2017.pdf, for example, Global Navigation Satellite System (GNSS) is the infrastructure that allows users with a compatible device (in this case, UE) to determine their position, velocity and time (PVT) by processing signals from satellites. GNSS signals are provided by a variety of satellite positioning systems, including global and regional constellations and Satellite-Based Augmentation Systems:

Global constellations: Global Positioning System (GPS) (USA), Globalnaya Navigazionnaya Sputnikovaya Sistema (GLONASS) (Russian Federation), Galileo (EU), BeiDou (PRC).

Regional constellations: Quasi-Zenith Satellite System (QZSS) (Japan), Indian Regional Navigation Satellite System (IRNSS) (India), and BeiDou regional component (PRC).

Satellite-Based Augmentation Systems (SBAS): Wide Area Augmentation System (WAAS) (USA), European Geostationary Navigation Overlay Service (EGNOS) (EU), MTSAT Satellite Augmentation System (MSAS) (Japan), GPS Aided GEO Augmented Navigation (GAGAN) (India), System for Differential Corrections and Monitoring (SDCM) (Russian Federation) and Satellite Navigation Augmentation System (SNAS) (PRC).

A GNSS may have more than one band or code/signals. For example, GPS newly supports L2C signal (band L2, civilian GPS signal) in addition to conventional L1 C/A (band L1 and coarse/acquisition code). However, most of GPS terminals still support only L1 C/A.

GNSS assistance information via cellar network provides benefits for positioning. In particular, it allows some of the information required for the UE's position to be determined via GNSS to be provided to the UE via the network rather than directly from a satellite. In an embodiment of the present technique, GNSS assistance information may be transmitted to the UE in one or more system information blocks from the gNB 101 and received by the wireless communications receiver 202 of the UE 104. Other GNSS information is received directly from a satellite as part of the first signal by the first receiver 200 of the UE 104.

GNSS satellites transmit codes and messages. The code is orthogonal code such as pseudorandom noise or the like. The messages includes the satellite orbit information such as Ephemeris and Almanac (which are needed for position estimation). Information regarding the Ephemeris and Almanac is provided in 3GPP TS 36.305 V13.0.0 (December 2015), for example. Here, it is defined that Ephemeris and Clock Models assistance provides the GNSS receiver (in this case, the UE) with parameters to calculate the GNSS satellite position and clock offsets. The various GNSSs use different model parameters and formats, and all parameter formats as defined by the individual GNSSs are supported by the signaling. It is also defined that Almanac assistance provides the GNSS receiver with parameters to calculate the coarse (long-term) GNSS satellite position and clock offsets. The various GNSSs use different model parameters and formats, and all parameter formats as defined by the individual GNSSs are supported by the signaling.

LTE Positioning Protocols (LPP) can support the communication of a portion of the GNSS information (e.g. the messages) from a location server to a UE via an LTE base station as a faster complement to the transmission of this information from GNSS satellites.

Assistance information for positioning from the cellular network (that is, from a base station of the network) helps alleviate various problems associated with GNSS positioning, including those relating to the sensitivity of messages transmitted by GNSS satellites, the time to first fix and the provision of precise positioning.

In particular, the use of a cellular network helps alleviate satellite signal strength issues. A GNSS satellite signal is very weak due to the long distance between the UE and the satellites. The UE may also miss the signal due to having a relatively small GNSS antenna. It is noted that GNSS codes (in particular, GPS codes) require a lower signal to noise ratio (SNR) than GNSS messages (in particular, GPS messages). Thus, a situation may arise in which a UE can receive the GNSS codes, but cannot receive the GNSS messages. Furthermore, even if a UE can receive the message with high SNR, measurement time, which is called the time to first fix (TTFF), may be an issue. For example, GPS transmits the messages with very low bit rate (e.g. 50 bits/second). If a UE is to receive all necessary messages from a scratch (both Almanac and Ephemeris), this will take 12.5 minutes. By contrast, the cellular network provides a much higher bitrate and the UE is able to receive all necessary messages over a time period of the order of seconds.

The volume of GNSS assistance information is expected to be increased in the near future because of envisaged requirements for more accurate positioning. 3GPP release-15 will introduce to support Real-Time Kinematic (RTK) positioning, which provides carrier-based ranging rather than conventional GNSS code based ranging. (For example, see https://www.novatel.com/an-introduction-to-gnss/chapter-5-resolving-errors/real-time-kinematic-rtk/). For example, JAXA (Japan Aerospace Exploration Agency) provides MADOCA (Multi-GNSS Advanced Demonstration tool for Orbit and Clock Analysis) for QZSS users, which needs precise point position (PPP). The assistance information from MADOCA is not only included in QZSS orbit and clock information, but is also used in other GNSS systems. However, the capacity of QZSS satellite communication (L-band) is limited. Highly common information which many users need may therefore be transmitted from the satellite. However, the remaining assistance information could be transmitted via other communication methods like (such as via the internet—for example, see https://ssl.tksc.jaxa.ip/madoca/public/public_index_en.html).

As described above, it is expected future wireless communications networks will efficiently support communications with devices including reduced complexity devices or machine type communication (MTC) devices, which may be deployed for supporting the "The Internet of Things", and may typically be associated with the transmissions of relatively small amounts of data with relatively high latency tolerance.

Figure 2:
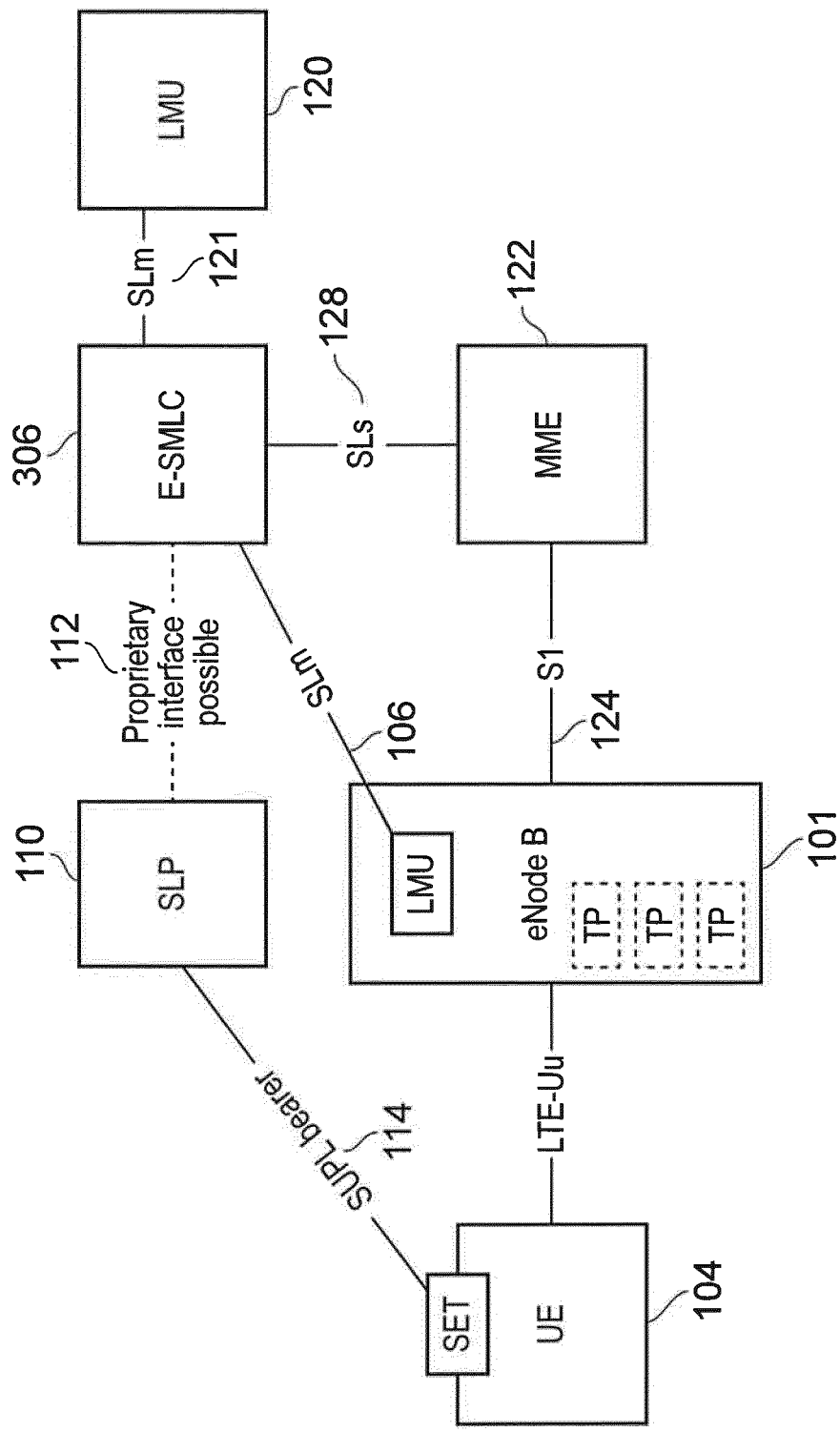
FIG. 2 is a schematic block diagram of a terminals device, an infrastructure equipment (gNodeB) and a location server which are configured to provide position assistance information to the terminal device for the terminal device to generate an estimate of its location according to an example embodiment of the present technique.

FIG. 2 provides a schematic block diagram of elements of a mobile radio network corresponding to those shown in FIG. 1 in which the position information is communicated to the UE. As shown in FIG. 2 in one example the location server 306 is an enhanced location server (eSMLC) which interfaces with an LMU 120 via an SLm interface 121. A mobility management entity 122 interfaces with eSMLC 306 via an SLs interface 128 and to the gNode B 101 via an S1 interface 124. The eSMLC 306 also interfaces with the gNode B 101 via an SLm interface 106. The eSMLC also interfaces with an SLP 110 via a proprietary interface 112 and to the UE 104 via an SUPL bearer 114.

Figure 3:
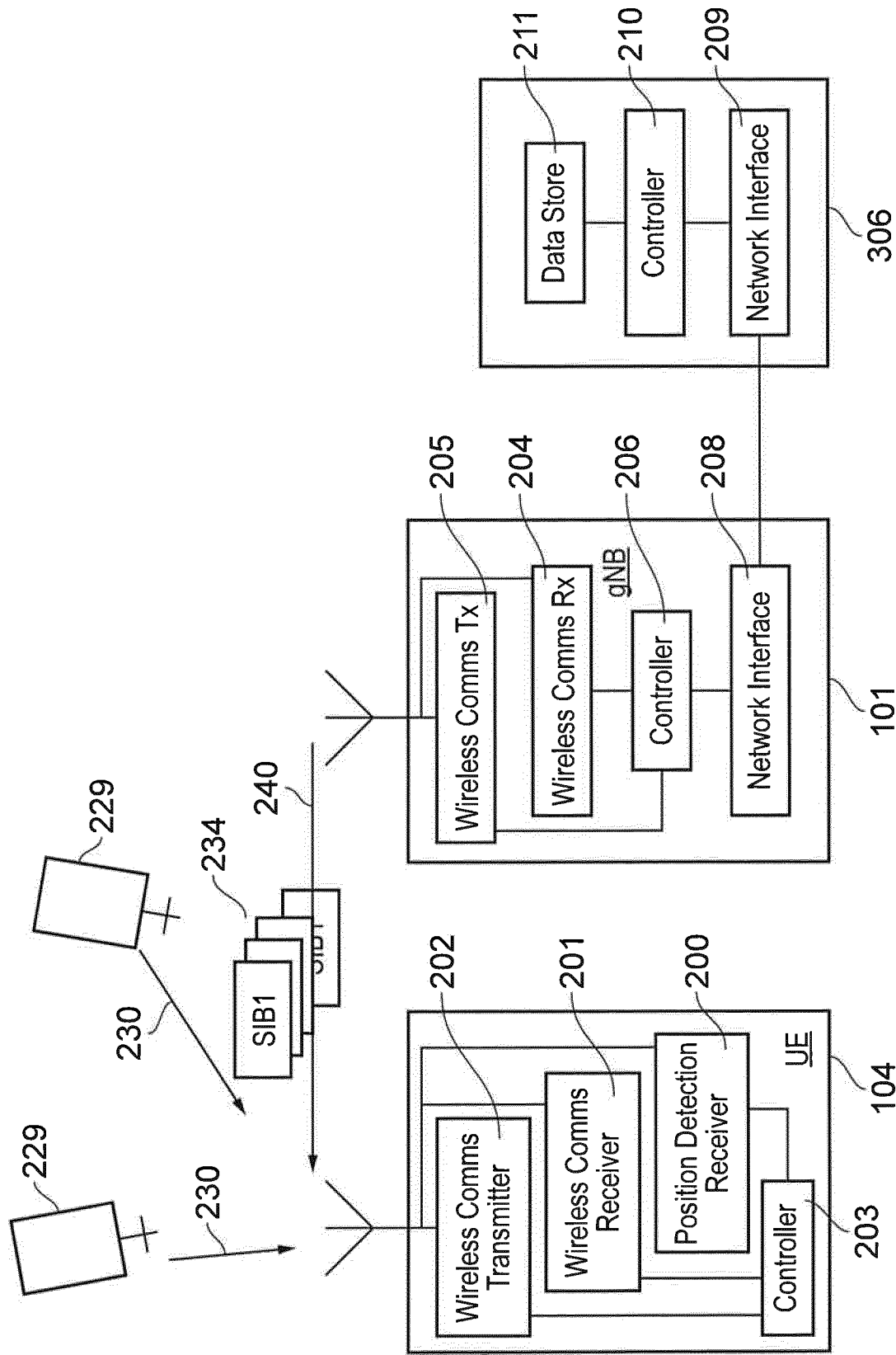
FIG. 3 is a schematic block diagram of parts of the wireless communications system shown in FIG. 1 associated with providing location services to a communications device according to example embodiments of the present technique.

FIG. 3 schematically shows some components of a UE 104, a base station 101 and a data processing apparatus 306, which acts a location assistance server or SMLC according to example embodiments of the present technique.

As shown in FIG. 3, the UE 104 comprises a position detection receiver 200, a wireless communications receiver 201, a wireless communications transmitter 202 and a controller 203. The position detection receiver 200 is for receiving wireless signals from each of one or more signal emitting devices located at respective spatial locations. Such signal emitting devices 229 may be GNSS (Global Navigation Satellite System) satellites, for example. The wireless communications receiver 201 is for reception of wireless signals (e.g. radio signals) carrying user data from the wireless communications network of which the gNB 101 forms part. The wireless communications transmitter 202 is for transmitting wireless signals (e.g. radio signals). The controller 203 is configured to control the position detection receiver 200, wireless communications receiver 201 and wireless communications transmitter 202 and to control the UE 104 to operate in accordance with embodiments of the present disclosure. The controller 203 may comprise various sub-units for providing functionality in accordance with embodiments of the present disclosure as explained further below. The wireless communications receiver, the wireless communications transmitter, the position detection receiver and the controller may be implemented as discrete hardware elements or as appropriately configured functions of the controller 203. The controller 203 may be suitably configured/programmed to provide the desired functionality described herein using conventional programming/configuration techniques for equipment in telecommunications systems. The position detection receiver 200, wireless communications receiver 201, the wireless communications transmitter 200 and the controller 201 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the UE 104 will in general comprise various other elements associated with its operating functionality, such as a user interface, battery, and the like. In the following embodiments, the position detection receiver 200, the wireless communications receiver 201, transmitter 202 and the controller 203 are implemented as circuitry.

It will be appreciated by those skilled in the art that, in arrangements of the present technique, the transceiver 202 of the communications device 104 may not always include a transmitter, for example in scenarios where the communications device 104 is a low-power wearable device.

In some examples, the receiver 204 in the base station 101 is configured to receive a request message from the UE 104 (not shown) after the UE 104 has detected one or more radio signals 230 transmitted from each of one or more signal emitting devices 232 located at respective spatial positions. The controller 206 in the base station 101 is configured, in response to the request message, to determine the respective spatial positions of each of the one or more signal emitting devices 232. The transmitter 205 is configured to transmit position assistance information indicating the respective spatial positions of each of the one or more signal emitting devices within a predetermined system information block (SIB).

In some embodiments, the controller 203 of the UE 104 is configured to determine the spatial position of the terminal device with respect to each of the one or more signal emitting devices based on a measurement of a characteristic (e.g. signal strength and/or quality) of the one or more radio signals 230 transmitted by each of the one or more signal emitting devices 233. The position assistance information indicates the respective spatial position of each of the one or more signal emitting devices 232. The controller 203 is then able to calculate the absolute position of the UE 104 in a given coordinate system based on the determined spatial position of the terminal device with respect to each of the one or more signal emitting devices and the respective spatial position of each of the one or more signal emitting devices (such calculation techniques are known in the art and will therefore not be discussed here).

Embodiments of the present technique may be applied to positioning using various types of signal emitting devices which emit signals detectable by the UE. Such alternative positioning may be used in indoor public spaces (such as shopping centres, art galleries, museums and the like) in which it is not possible to obtain a satellite signal of sufficient strength and/or quality. In this case, information indicative of the position of one or more signal emitting devices is used in conjunction with a UE's distance from each signal emitting device (as measured based on a first signal from each signal emitting device by the position detection receiver 200 of the UE 104, for example) in order to determine the UE's position within the building. In this case, assistance information (indicative of the position of each of the one or more indoor signal emitting devices) could be transmitted to a UE via the network. More generally, the present technique may be implemented using one or more satellite or non-satellite signal emitting devices located at respective predetermined positions within a predetermined space. Accordingly the position detection receiver 200 may be configured with a plurality of detectors. Various additional sensors may also be used for UE positioning, as explained later on. More information concerning the configuration of a UE to received assistance information is disclosed in EP17199204 [7] the content of which are herein incorporated by reference.

In the context of 5G (NR) positioning, Position Velocity and Time (PVT) estimation may not only use GNSS positioning (or, more generally, positioning based on one or more signal emitting devices, which may include GNSS satellites or indoor signal emitting devices), but also one or more other sensors of various types. Thus, in addition to or instead of the position detection receiver 200 being configured to receive a signal from one or more signal emitting devices, the position detection receiver 200 may also receive signals from one or more other sensors comprised as part of the UE 104. Such sensors may include accelerometers, gravimeters, barometer sensors, gyroscopic sensors or the like, and may be used in various ways in addition to or instead of GNSS or other emitted signals. The term "sensor" should be interpreted broadly as an element (implemented using circuitry, for example) configured to detect one or more characteristics on the basis of which a position of the UE (or at least one or more services applicable based on the position of the UE) may be determined. Various different types of sensor may be used in combination in order to carry out UE positioning.

Referring back to FIG. 3, the base station 101 comprises a transmitter 205, a receiver 204, a network interface 208 and a controller 206. The transmitter 205 is for transmission of wireless signals (e.g. radio signals), the receiver 204 is for reception of wireless signals (e.g. radio signals), a network interface 208 for transmission and reception of signals (e.g. to and from a location server, as explained below) over a network such as the internet and the controller 206 is configured to control the transmitter 205, receiver 204 and network interface 208 and to control the base station 101 to operate in accordance with embodiments of the present disclosure. The controller 206 may comprise various sub-units for providing functionality in accordance with embodiments of the present disclosure as explained further below. These sub-units may be implemented as discrete hardware elements or as appropriately configured functions of the controller 206. The controller 206 may be suitably configured/programmed to provide the desired functionality described herein using conventional programming/configuration techniques for equipment in telecommunications systems. The transmitter 205, receiver 204, network interface 208 and controller 206 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the base station 101 will in general comprise various other elements associated with its operating functionality. In the following embodiments, the transmitter 205, receiver 204, network interface 208 and controller 206 are implemented as circuitry.

The data processing apparatus forming the eSMLC 306 comprises a network interface 209, a storage medium 211 and a controller 210. The network interface 209 is for transmission and reception of signals (e.g. to and from infrastructure equipment, as explained below) over a network such as the internet. The storage medium 211 is for storage of digital data (and may take the form of a hard disk drive, solid state drive, tape drive or the like, for example). The controller 210 is configured to control the network interface 208 and storage medium 211 and to control the data processing apparatus 306 to operate in accordance with embodiments of the present disclosure. The controller 210 may comprise various sub-units for providing functionality in accordance with embodiments of the present disclosure as explained further below. These sub-units may be implemented as discrete hardware elements or as appropriately configured functions of the controller 210. The controller 210 may be suitably configured/programmed to provide the desired functionality described herein using conventional programming/configuration techniques for equipment in telecommunications systems. The network interface 209, storage medium 211 and controller 210 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry.

It will be appreciated that, although not shown, the eSMLC 306 will in general comprise various other elements associated with its operating functionality. In the following embodiments, the network interface 209 and controller 210 are implemented as circuitry.

As will be appreciated from the above description of the arrangement shown in FIGS. 1, 2 and 3, in order for a UE to determine its location, system information blocks transmitted by the wireless communications network from the location server 306 deliver position assistance information to the UEs. Embodiments of the present technique address a technical problem associated with a time for delivering the position assistance information to the UEs.

As explained above position assistance information may be transmitted using either on-demand system information or periodically delivered system information. However the positioning assistance information may change unexpectedly. When an unexpected change of positioning assistance information occurs, the eNodeB has to inform UE of it as soon as possible. However, the cost of quick response of paging (e.g. shorter DRX period) is high in terms of UE power consumption. When the risk of an unexpected event is high, a quick response is required. By contrast, when the risk of an unexpected event is low, the power saving should be prioritized.

The position assistance information may change for example as a result of a solar storm which affects the ionosphere. As such, a character of the ionosphere changes in space and time can change as a result of solar activity, as disclosed for example in http://gpsworld.com/innovation-gnss-and-ionosphere-11036/, which represents a well-known problem in GNSS positioning. When the character of the ionosphere changes suddenly or any other unexpected aspect changes such as a position or performance of the signal emitting devices (satellite) 229, then this can result in errors in the positioning information. If the problem is detected, the satellite orbit/clock could be rectified from an earth station. Artificial parameters can therefore change unexpectedly in terms of the validity time of assistance information. If there is a change in the position assistance information, then the network should immediately notify the change to the UEs. Then, the UEs can take action, for example by receiving new position assistance information as soon as possible to avoid a negative effect such as a miscalculation of its current location.

In prior art document R2-1710094 (Samsung) [9] a method of providing an update of on demand system information is disclosed in which an immediate update of the system information is proposed for on-demand system information. However a UE does not have to use an immediate update of system information for positioning purpose because the change of assistance information can be predictable to a certain extent. Accordingly it may be sufficient for UE to use a normal on-demand system information update method in which the system information is updated after a system information modification period.

The following provides a brief explanation of a typical arrangement for communicating system information and other urgent communications such as earthquake and tsunami warning signals (ETWS) in order to gain a better appreciation of embodiments of the present technique.

System Information Communication

The System information blocks (SIB) 234 are known to be used within 3GPP to provide system information to UEs operating in a wireless communications network. The SIBs 234 are broadcast by the gNBs to the UEs 104 within the network in known resource elements of the wireless access interface. Before a UE can use a cell provided by a base station, the terminal is expected to carry out a series of steps. According to a conventional arrangement for other 3GPP systems like LTE, a UE detects a cell and cell-ID using the Primary Synchronisation Signal (PSS) and Secondary Synchronisation Signal (SSS) to detect the cell, and then receives a Master System Information Block (MIB) from the Physical Broadcast Channel (PBCH) and further System Information Blocks (SIB) from the PDSCH. More specifically a UE would have to first achieve time and frequency synchronisation with the cell, typically using the legacy PSS and SSS emitted by the base station. Then, the terminal will decode the PBCH to acquire the MIB. The MIB contains amongst other things information for the terminal to acquire further System Information, namely SIB1 that is transmitted via the PDSCH. SIB1 contains scheduling information for acquiring the remaining System Information portions (other SIBs).

As disclosed for example in TS 36.331 according to an example 3GPP specification, a change in the system information may only occur during a specific modification period comprising specific radio frames. System information may be transmitted a number of times with the same content within a modification period, as defined by its scheduling. The modification period boundaries are defined by system frame number values. The modification period is configured by system information. To enable system information update notification for UEs is an idle state are configured to use a discontinuous reception cycle (DRX) cycle which is longer than the modification period, an eDRX acquisition period is defined.

Figure 4:
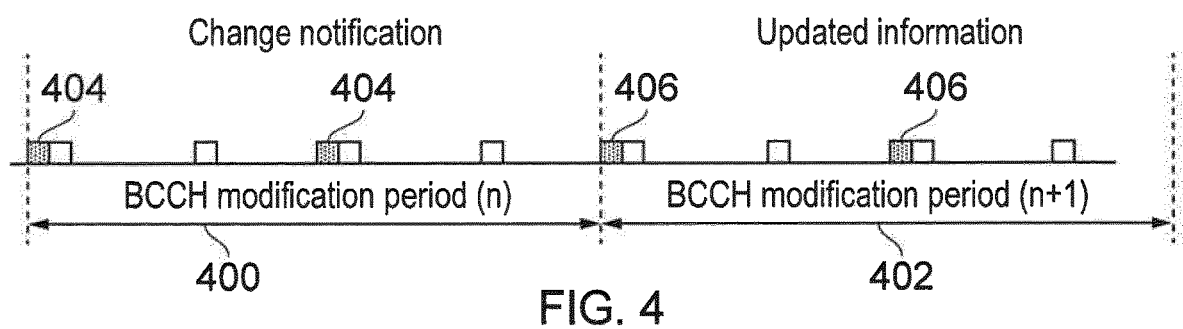
FIG. 4 is a schematic representation of a timing of transmitting updated system information in modification periods according to a known arrangement.

FIG. 4 provides a schematic representation of a system information modification period in which a change notification is provided in a first period 400 and updated information is provided in a second period 402.

When a wireless communications network changes the system information or some of it, it first notifies the UEs about this change. This may be done throughout a modification period. In the next modification period, the network transmits the updated system information. These general principles are illustrated in FIG. 4. As shown in FIG. 4 in the first modification period 400, one or more system information blocks 404 provide an indication that the system information is changing and one or more system information blocks 406 in the next modification period 402 deliver the updated system information. Upon receiving a change notification, the UE not configured to use a DRX cycle that is longer than the modification period acquires the new system information immediately from the start of the next modification period. Upon receiving a change notification applicable to eDRX, a UE in idle mode, which is configured to use a DRX cycle that is longer than the modification period 400, 402 acquires the updated system information immediately from the start of the next eDRX acquisition period. The UE applies the previously acquired system information until the UE acquires the new system information. More information can be found in TS 36.331, the contents of which are incorporated herein by reference.

According to some examples system information may be used to provide positioning assistance information to UEs in order to provide location services, in which the position assistance information is carried in one or more of these remaining SIBS. However as will be appreciated from the above description there can be a delay in acquiring updated system information which may not make this known arrangement suitable for delivering updated position assistance information.

System Information Change Procedure for ETWS/CMAS (LTE),

Some wireless communications systems can be configured to provide an earthquake and tsunami warning signals (ETWS) to a class of UEs which are configured to receive this ETWS. Such an arrangement is disclosed for example in TS 23.828 V8.0.0 (September 2008). Similarly, UEs may be configured to receive a warning through a Commercial Mobile Alert System (CMAS), which disseminates emergency alerts to UEs as disclosed for example in TS 23.042 v9.4.0 (June 2010). According to these systems a warning message is delivered using a paging message which the UEs can recognize. After detecting this paging, the UEs proceed to receive the content of the warning message by detecting system information as disclosed in TS 36.331. In order to reduce the response time, ETWS/CMAS has special procedures of system information change notification which is as follows:

- An eNodeB triggers paging to notify the UEs of a system information change (At this point, the system information has not been changed yet)
- The UEs receive the information "systemInfoModification" with paging, which indicates when the system information will be changed.
- eNodeB waits for the update of system information until the boundary of system information modification period.
- eNodeB changes the system information with new systeminfo value tag (version of SI) at the boundary timing.
- UE receives the updated system information.

As disclosed in TS 36.331, there are two levels of ETWS which are a primary notification which indicates minimum but urgent information and a secondary notification which provides larger messages including supplementary information about a particular event. The primary notification is indicated by a first paging message and the secondary notification is indicated by a second paging message. According to this arrangement there is a connection between the type of paging message and the system information block which is read by the UE upon detecting that paging message. This arrangement is shown graphically in FIG. 5.

Figure 5:
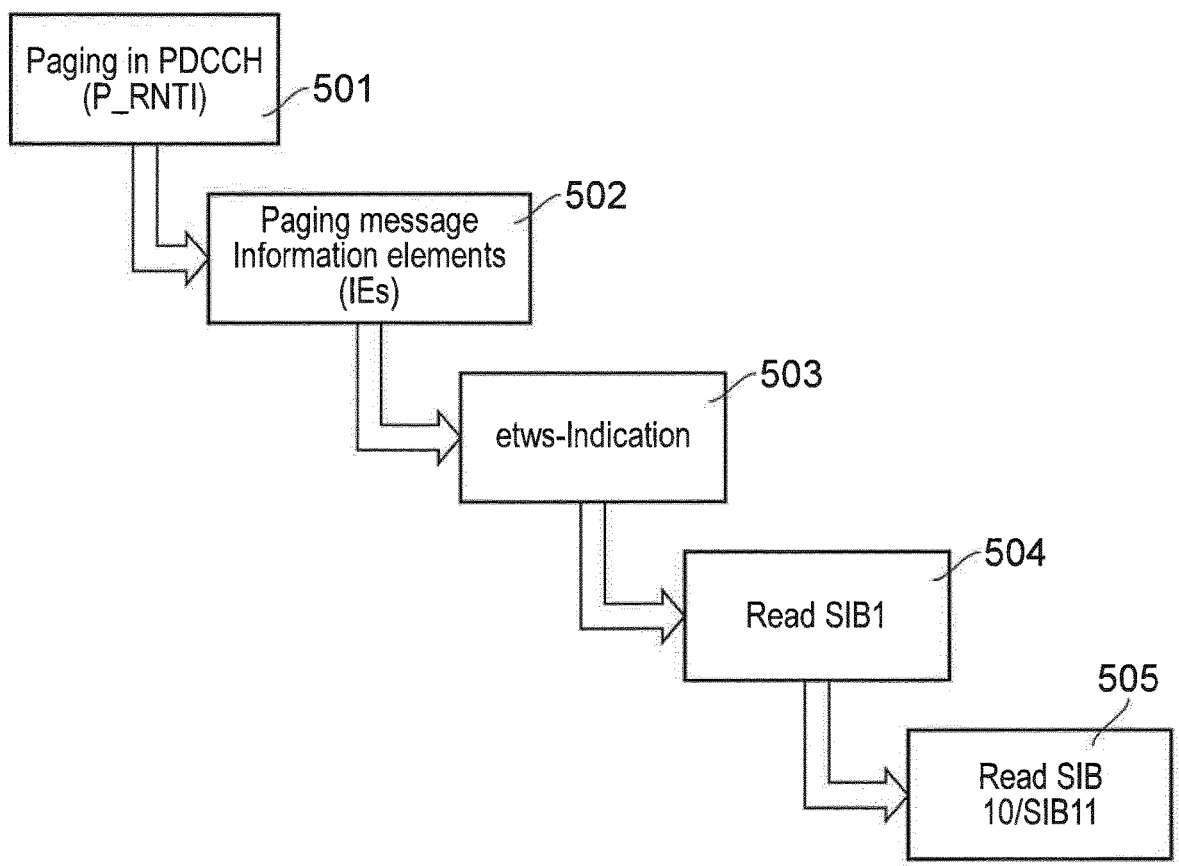
FIG. 5 is a schematic diagram illustrating a flow of actions performed by a terminal device when receiving updated system information of a particular type.

As shown in FIG. 5 a UE detects a paging message in a PDCCH in step 501 in which a particular PRNTI is transmitted which can indicate various things including that a paging message is to be sent to a particular UE to receive downlink information. Accordingly in step 502 the UE analyses the paging messages and the information elements contained in the paging message. In step 503 the UE detects that the paging message has a particular RNTI associated with an ETWS indication.

If UE has ETWS capability, the UE proceeds to read a particular system information block scheduling (SIB1) in step 504, then UE proceeds to read a particular system information block (SIB) in step 505. If UE does not have ETWS capability, an ETWS indication is ignored according to the current 3GPP specification.

For example the ETWS primary notification is contained in SIB type 10 whereas the ETWS secondary notification is contained in SIB type 11. According to this information therefore because the UE has no time to read both an indication of a change in the system information and then the updated information in successive notification periods, a paging message is used to inform the UE of information transmitted in an SIB so that the UE can proceed in the next notification period to receive that information from the SIB.

According to TS 36.331 ETWS and/or CMAS capable UEs in an RRC connected mode are configured to read paging at least once every paging cycle to check whether ETWS and/or CMAS notification is present or not. In order to provide the immediate response like CMAS/ETWS, UE has no time to read system information value tag to check which SIB is updated. Therefore, in conventional LTE, UEs know the type of paging in paging message and recognize this message which informs the UEs directly to read the relevant SIB without waiting for next modification period.

Example of Paging Procedure for Positioning Assistance Information

One example of receiving a Paging message by the UE to receive updated position assistance information is as follows:

if the etws-Indication is included in a paging message and the UE is UE positioning capable and UE does not support an impact mitigation function (e.g. dual band receiver):
2> re-acquire SystemInformationBlockType1 immediately, i.e., without waiting until the next system information modification period boundary;
2> if the schedulingInfoList indicates that SystemInformationBlockType X is present:
3> acquire SystemInformationBlockType Y;
2> if the schedulingInfoList indicates that SystemInformationBlockType Y is present:
3> acquire SystemInformationBlockType1

Adaptive Response Time of SI Change Notification

As indicated above, there are occasions in which positioning assistance information can become corrupted or invalid as a result, for example of solar storms. However such storms are predictable to a certain extent; see for example Solar Radiation Storm Forecast http://www.swpc.noaa.gov/products/3-day-forecast. Such forecasts can provide a prediction of when the sun is active and where a solar storm can impact on the earth, for example near the Earth's magnetic equator. If the risk of a severe space weather storm is high, a cost of quick response paging could be justified.

Embodiments of the present technique can provide an arrangement in which some information is transmitted to communications devices (UEs) to indicate a relative likelihood of unexpected events causing a change in the positioning information. In response the UEs can react to perform a predetermined action depending upon the relative risk level. In one example the UE can switch from a normal arrangement for receiving a change of the system information to an arrangement corresponding to an ETWS communication to read the SI information without waiting for the next period of notification change. In another example the UEs can switch from a long DRX period to a shorter DRX period in order to increase the likelihood that the UE is in a connected state or at least powered up state when new position assistance information is transmitted. Accordingly a power consumed by the UE may be adapted according to the relative risk that the position assistance information may change. This is because a DRX (discontinuous reception cycle) is typically comprised of a first part of a cycle in which a receiver of the UE is in a power-up state in which it can detect signals transmitted from the eNodeB and a second part of the cycle in which the receiver is power-down or reduces power to a state in which it is less likely or does not detect signals transmitted from the infrastructure equipment. In a lond DRX cycle therefore, the time in which the UE's receiver is in a powered-down state is longer, thereby saving more power at an expense of being able to detect a new version of the position assistance information.

Example embodiments of the present technique can therefore provide an arrangement of UEs and infrastructure equipment in which:

1. The system information can indicate a relative risk of unexpected events causing a rapid change in the positioning assistance information. Alternatively, dedicated RRC signalling can be used to indicate a relative risk of unexpected events affecting the positioning assistance information.
2. If the relative risk is low, then the UE uses conventional notification of SI change, in which the UE receives an indication of the change of the SI in on modification period and the updated SI in the next modification period.
3. If the relative risk is high, then the UE receives a special notification of SI change, which could support the immediate notification
    For example,
    a. Switch from normal operation to ETWS like operation of SI change notification without waiting for the next period of notification change.
    b. Shorter or reduced DRX period than a normal DRX.
4. If the relative risk is very high (imminent), the UE may activate one or more than one alternative positioning techniques as a backup, for example,
    a. Network positioning for example an Observed Time Difference of Arrival (OTDOA)
    b. Sensor positioning for example an inertial measurement unit (IMU)
    If the result 4a, 4b, is inconsistent with GNSS, the UE does not use a GNSS estimation of its location and compensates by using other positioning techniques if possible.
    c. If UE is being used for a critical application, in which loss of positioning accuracy could cause injury to persons or property for example, such in autonomous driving, then the UE may suspend some of the position estimation functions or suspend the operation to avoid the accident/damage.

Figure 6:
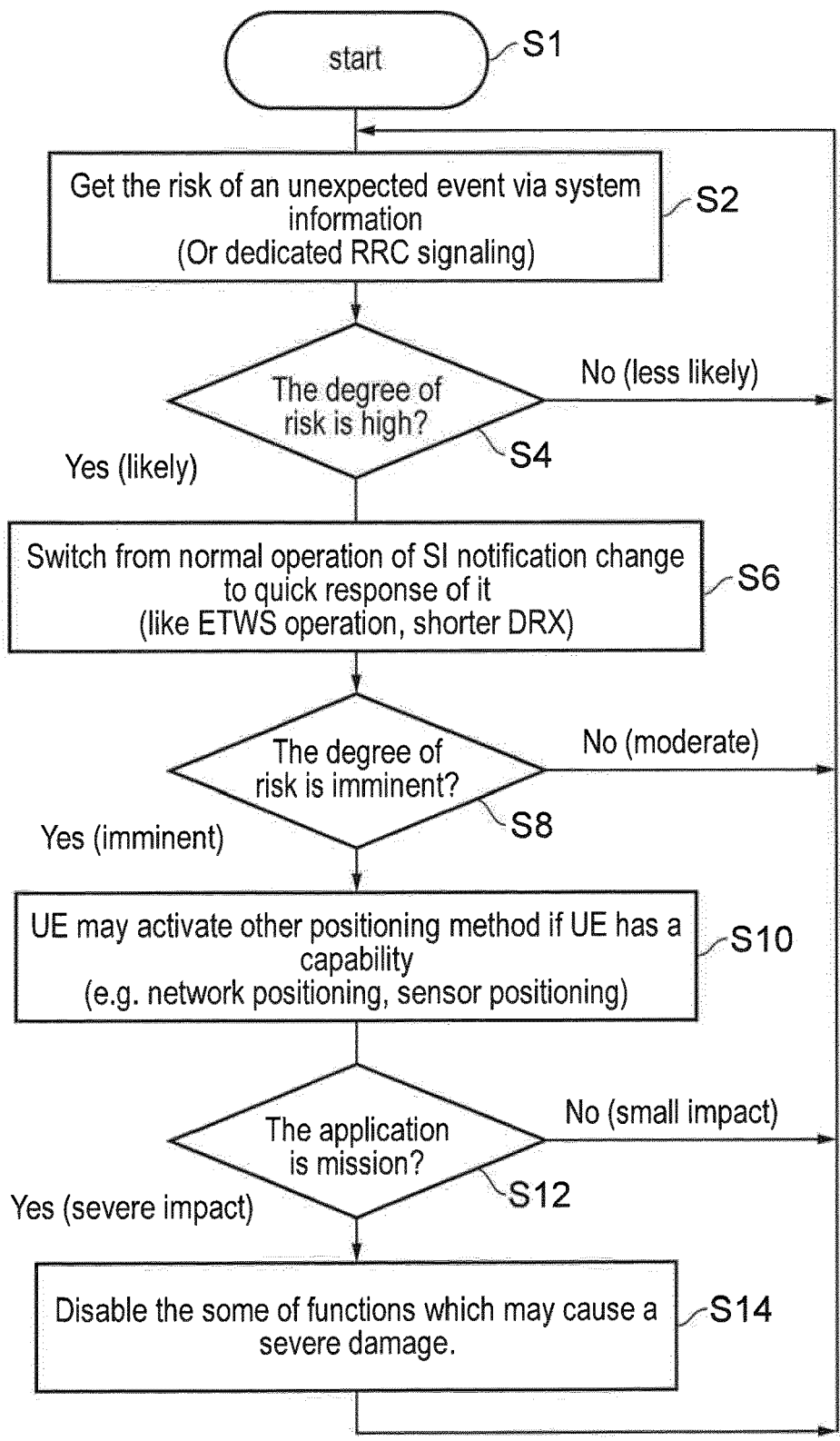
FIG. 6 is a flow diagram representing one example of a process performed by a terminal device according to an example embodiment of the present technique.

The example operation of the UE shown in FIG. 3 according to any example embodiment is shown in FIG. 6 in which the controller circuitry 203 controls the position detection receiver 200 as well as the wireless communications transmitter and receiver 202, 201 to react to an indication of a relative risk on the change of the position assistance information. FIG. 6 is summarized as follows:

S2: After starting at start state SI the UE receives an indication giving a relative representation of a risk of an unexpected event which could result in the change of the position assistance information. In one example, the relative indication is transmitted via the system information from an eNodeB, or in another example the relative risk is transmitted to UE from the eNodeB as an RRC communication.

At a first decision point S4, the UE determines whether the indication of the relative risk indicates that the risk is high. If no then processing proceeds back to step S2. If the relative indication of risk is high then processing proceeds to step S6.

At step S6, the UE switches from a normal mode of operation in which it receives system information periodically in modification periods as explained above with reference to FIG. 4 to a state in which it monitors paging requests for an indication that position assistance information communicated via system information has changed. Accordingly the UE should proceed directly to receive the system information in the present notification period after receiving an indication that the position assistance information has changed as a paging message.

At decision point S8 the UE determines whether the relative risk indicates that a change of system information is imminent. If no then processing proceeds back to step S2. However if the indication of the relative risk of change of the position assistance information represents an imminent change then processing proceeds to step S10.

S10: If there is an indication that there is an imminent change in position assistance information then the UE may adapt its behaviour for example to use a different network, positioning method an employing different sensors in order to identify its position.

S12: If the UE determines that the location of its position is critical to its operation according to an application of the UE, in other words if the application is mission critical according to the relative level of importance, then at decision point S12 the UE either proceeds to step S14 if the change in the position assistance information is mission critical or if not proceeds back to step S2.

S14: If there is an imminent change in position assistance information or at least there is an error in the current position assistance information and the UE is performing a mission critical service or application then the UE may proceed to disable some of the functions which it is performing relating to the location of its position such as suspending autonomous driving or navigating.

Embodiments of the present technique can provide an advantage because when there is a relatively low risk of a change in the position assistance information, UEs can be configured to adopt a longer discontinuous reception (DRX) cycle thereby reducing power consumption. The UEs can adopt a shorter DRX cycle, consuming more power when there is a greater relative risk of a change in the position assistance information so that the UEs can react more quickly to receive updated position assistance information. As a result the UEs can estimate their position more reliably.

Special Handling of Dual Hand (or Triple Band) GNSS Receiver

As indicated above, the UE can be provided with a position detection receiver 200 which includes a plurality of detectors configured to monitor signals from signal emitting devices (satellites) from more than one frequency band. For this example, the UE may not need to respond to any urgent indication of a change of position assistance information. For example, a dual band GNSS receiver (e.g. L1 and L5) is robust to Ionosphere changes. For example during a severe space weather storm, positioning errors in the order of tens of metres or more can occur, whereas a dual frequency GPS system can provide position information accurate to a few centimetres (see http://www.swpc.noaa.gov/impacts/space-weather-and-gps-systems). As such, if the UE's position detection receiver 200 has a positioning capability of dual band then the UE can ignore the urgent paging of positioning assistance information update related to Ionosphere changes.

Indication of Change of Position Assistance Information Using Paging

According to some example embodiments a wireless communications network can be configured to indicate in a paging message when the related positioning information will be changed e.g. in the format of timestamp or number of radio frame. With this indication, the network can communicate the time of the change of the position assistance information within a paging message for alerting a UE to a downlink communication or the paging message for indicating a change to the SI change, which is used to indicate the change of the position assistance information. After receiving this timing information in the paging message, the UE knows when it needs to read the related changed positioning information from the SIB.

According to some embodiments the paging message could simply indicate that the position assistance information is invalid.

In addition to an indication that the position assistance information is invalid, in some embodiments the paging message can also include new information elements in a next level which can indicate one or more system information blocks (SIB) providing the updated position assistance information.

Figure 7:
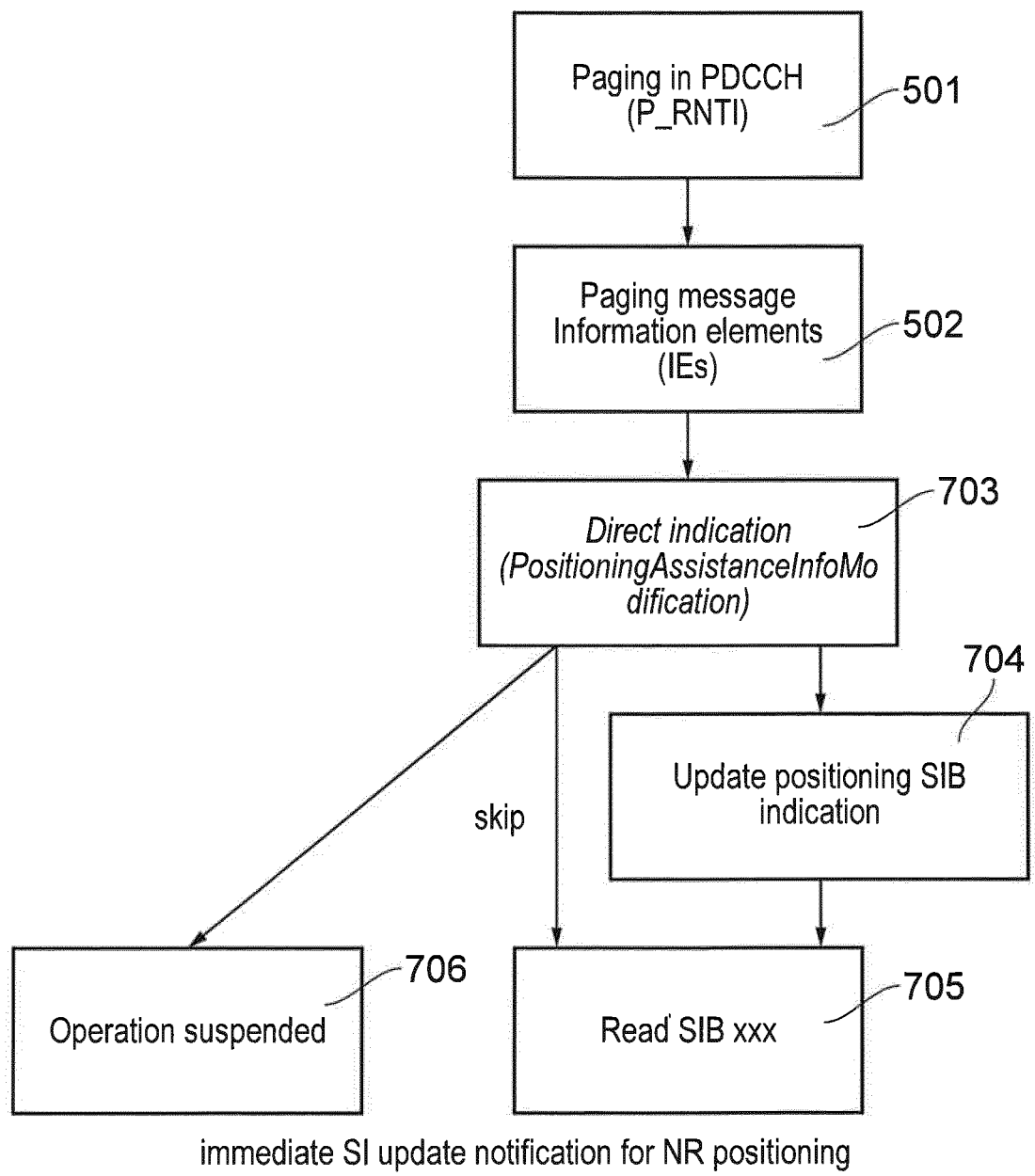
FIG. 7 is a schematic diagram illustrating a flow of actions performed by a terminal device when receiving updated position assistance information.

An example embodiment in which an adaptation of paging messages is provided in order to signal a change in position assistance information is shown in FIG. 7. The process steps shown in FIG. 7 performed by the UE correspond to those shown in FIG. 5 that have been adapted to provide an example embodiment in which a paging message includes an indication that position assistance information is invalid. As shown in FIG. 7 steps 501 and 502 correspond to those shown in FIG. 5. However at step 703, a UE detects that the paging message received from an eNodeB provides an indication that the position assistance information is invalid or updated. Accordingly the UE can take appropriate action such as suspending location services or suspending the performance of a particular task or application which may be mission critical in respect of locating its position.

At step 704, the UE can proceed to read updated position assistance information from system information block provided in a next notification period which is available in order to update the position assistance information. Accordingly at step 705 the UE receives the system information block types according to that provided for updating the position assistance information as indicated by the paging message.

Alternatively, UE may skip the step 704 if the relevant update SIB is known, then at step 705 the UE receives the system information block types according to that provided for updating the position assistance information as indicated by the paging message.

In the step 706, UE may proceed the urgent action (e.g. suspend the operation of construction machine) in parallel to update the system information.

According to one example embodiment an information element in the paging message is provided to indicate to UEs that they should read a particular system information block carrying new position assistance information. An example of this information element is indicated in the table below as "Direct Indication Information for MTC" as entry numbered 6.

TABLE

Additional indications for positioning assistance information update.

| Bit | Direct Indication information |
|---|---|
| 1 | systemInfoModification |
| 2 | etws-Indication |
| 3 | cmas-Indication |
| 4 | eab-ParamModification |
| 5 | systemInfoModification-eDRX |
| 6 | PosisitioingAssistanceInfoModification |
| 7, 8 | Not used, and shall be ignored by UE if received. |

According to some example embodiments two levels of notification could be provided for position assistance information depending on a degree of criticality/urgency. A primary notification indicates that there has been event requiring immediate action without details, whereas a secondary notification provides more information concerning the detail of the issue and reason for it.

Numerous modifications and variations of the present disclosure are possible in light of the above teachings. It is therefore to be understood that within the scope of the appended claims, the disclosure may be practiced otherwise than as specifically described herein.

Instead of newly defining PosisitioingAssistanceInfoModification, the conventional indicator such as systemInfoModification, systemInfoModification-eDRX are used to communicate an updated version of the position assistance information. Depending on the degree of risk indicated by system information, the same interpretation/behavior of PosisitioingAssistanceInfoModification maybe applied.

Instead of newly defining the degree of risk indicated by system information, more than one PosisitioingAssistanceInfoModification indicator is defined.

According to the various embodiments presented in the above explanation, embodiments of the present technique can provide a terminal device for use in a wireless telecommunications network, the terminal device comprising wireless communications receiver circuitry configured to receive signals from the infrastructure equipment via a wireless access interface provided by the infrastructure equipment, the wireless access interface being divided into a plurality of modification periods, position detection receiver circuitry configured to receive a radio signal from which measurements can be used to assist in determining a position of the terminal device, and controller circuitry. The controller circuitry is configured to control the wireless communications receiver circuitry to detect one or more system information blocks carrying position assistance information transmitted from the infrastructure equipment by receiving in one of the plurality of the modification periods an indication that the one or more system information blocks should be received in a subsequent one of the modification periods and to receive the one or more system information blocks carrying the position assistance information in the subsequent one of the modification periods, the position assistance information providing information which can be used to assist in determining the position of terminal device, and to detect a paging message indicating that the position assistance information has changed and in response to the paging message to detect the one or more system information blocks carrying the updated version of the position assistance information in one of the plurality of modification periods.

In one example, the paging message includes an indication of the modification period in which the one or more system information blocks carrying the updated version of the position assistance information are transmitted by the infrastructure equipment. In another example, the paging message provides an indication of the one or more system information blocks carrying the updated version of the position assistance information. In another example the paging message provides an indication that the position assistance information is invalid, and in response the controller circuitry is configured to detect the one or more system information blocks carrying the updated version of the position assistance information.

According to another example embodiment a terminal device for use in a wireless communications network comprises wireless communications receiver circuitry configured to receive signals from the infrastructure equipment via a wireless access interface provided by the infrastructure equipment, the wireless access interface being divided into a plurality of modification periods position detection receiver circuitry configured to receive a radio signal from which measurements can be used to assist in determining a position of the terminal device, and controller circuitry. The controller circuitry is configured to control the wireless communications receiver circuitry to receive position assistance information transmitted from the infrastructure equipment in a broadcast channel, the position assistance information providing information which can be used to assist in determining the position of terminal device, and to cooperate with the position assistance information to generate an estimate of the position of the terminal device from a combination of the position assistance information and the received radio signal. Furthermore, the controller circuitry is configured to detect a paging message indicating that the position assistance information has changed, to determine whether the terminal device is performing a task dependent upon the estimate of the position of the terminal device, and in response to detecting the paging message indicating that the position assistance information has changed to suspend the performing of the task.

According to another example embodiment there is provided a location server configured in operative association with a wireless communications network, comprising a position information receiver configured to receive signals from one or more signal emitting devices which are located at predisposed locations, the signals providing an indication of the location of each of the signal emitting devices and controller circuitry. The controller circuitry is configured to generate position assistance information providing the indication of the location of each of the signal emitting devices, and to communicate an indication of the position assistance information through an interface to infrastructure equipment of the wireless communications network for communicating to one or more terminal devices, to determine a relative risk that the position assistance information will change, and to transmit through the interface to infrastructure equipment of the wireless communications network the indication of the relative risk that the position assistance information will change.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Various further aspects and features of the present technique are defined in the appended claims. Various embodiments of the present technique are defined by the following numbered paragraphs:

Paragraph 1. A terminal device for use in a wireless telecommunications network, the terminal device comprising:

wireless communications receiver circuitry configured to receive signals from the infrastructure equipment via a wireless access interface provided by the infrastructure equipment, position detection receiver circuitry configured to receive a radio signal from which measurements can be used to assist in determining a position of the terminal device, and controller circuitry configured to control the wireless communications receiver circuitry to detect one or more system information blocks carrying position assistance information transmitted from the infrastructure equipment, the position assistance information providing information which can be used to assist in determining the position of terminal device, to control the position detection circuitry to estimate the position of the terminal device by combining the identified position assistance information with the radio signal received by the position detection receiver circuitry, wherein the controller circuitry is configured with the wireless communications receiver circuitry to receive from the infrastructure equipment an indication of relative risk that the position assistance information will change, and in response to the indication of the relative risk that the position assistance information will change to adapt the receiving of the one or more system information blocks to receive an updated version of the position assistance information in accordance with the relative risk.

Paragraph 2. A terminal device according to paragraph 1, wherein the indication of the relative risk received from the infrastructure equipment represents an indication of an immediate change of the position assistance information, and the controller circuitry is configured with the receiver circuitry to receive a paging messaging from the infrastructure equipment providing the indication of the immediate change of the position assistance information.

Paragraph 3. A terminal device according to paragraph 2, wherein the updated version of the position assistance information is provided in the paging message carrying the immediate position assistance information update.

Paragraph 4. A terminal device according to paragraph 1, wherein the controller circuitry is configured in combination with the wireless communications receiver circuitry to detect the one or more system information blocks carrying the position assistance information in accordance with a discontinuous reception cycle comprising in a first part of the cycle for detecting the one or more system information blocks and a second part of the cycle in which the one or more system information blocks are not detected, and the controller circuitry is configured to adapt one or both of a length of the first and the second parts of the cycle in accordance with the relative risk.

Paragraph 5. A terminal device according to paragraph 1, wherein the wireless access interface is divided into a plurality of modification periods the controller circuitry is configured in combination with the wireless communications receiver circuitry in accordance with an indicated first relative risk to detect one or more system information blocks carrying the updated position assistance information by receiving in one of the plurality of the modification periods an indication that the one or more system information blocks should be received in a subsequent one of the modification periods and to receive the one or more system information blocks carrying the updated version of the position assistance information in the subsequent one of the modification periods, and in accordance with an indicated second relative risk representing a greater likely of a change in the position assistance information, to adapt the receiving of the one or more system information blocks carrying the updated version of the position assistance information to detect a paging message indicating that the position assistance information has changed and in response to the paging message to detect the one or more system information blocks carrying the updated version of the position assistance information in one of the plurality of modification periods.

Paragraph 6. A terminal device according to paragraph 5, wherein the paging message includes an indication of the modification period in which the one or more system information blocks carrying the updated version of the position assistance information are transmitted by the infrastructure equipment.

Paragraph 7. A terminal device according to paragraph 5 or 6, wherein the paging message provides an indication of the one or more system information blocks carrying the updated version of the position assistance information.

Paragraph 8. A terminals device according to any of paragraphs 2 to 7, wherein the paging message provides an indication that the position assistance information is invalid, and in response the controller circuitry is configured to detect the one or more system information blocks carrying the updated version of the position assistance information.

Paragraph 9. A terminal device according to any of paragraphs 1 to 8, wherein the position detection receiver circuitry is configured to include a plurality of detectors, one of the detectors being configured to detect the radio signal and one or more other detectors for detecting one or more other radio signals which can be used to generate an estimate of a location of the terminal device, and in response to the indication of the relative risk that the position assistance information will change to adapt the position detection receiver to generate the estimate of the location of the terminal device using the one or more other detectors.

Paragraph 10. A terminal device according to any of paragraphs 1 to 9, wherein the controller circuitry is configured to determine whether the terminal device is performing a task dependent upon the estimate of the location of the terminal device, and in response to the indication of the relative risk that the position assistance information will change to suspend the performing of the task.

Paragraph 11. A terminal device according to paragraph 2, 3 or 4, wherein the controller circuitry is configured to determine whether the terminal device is performing a task dependent upon the estimate of the location of the terminal device, and in response to receiving the paging message indicating an immediate change to the position assistance information to suspend the performing of the task.

Paragraph 12. A terminal device for use in a wireless telecommunications network, the terminal device comprising:
  wireless communications receiver circuitry configured to receive signals from the infrastructure equipment via a wireless access interface provided by the infrastructure equipment, the wireless access interface being divided into a plurality of modification periods
  position detection receiver circuitry configured to receive a radio signal from which measurements can be used to assist in determining a position of the terminal device, and
  controller circuitry configured to control the wireless communications receiver circuitry
  to detect one or more system information blocks carrying position assistance information transmitted from the infrastructure equipment by receiving in one of the plurality of the modification periods an indication that the one or more system information blocks should be received in a subsequent one of the modification periods and to receive the one or more system information blocks carrying the position assistance information in the subsequent one of the modification periods, the position assistance information providing information which can be used to assist in determining the position of terminal device, and
  to detect a paging message indicating that the position assistance information has changed and in response to the paging message to detect the one or more system information blocks carrying the updated version of the position assistance information in one of the plurality of modification periods.

Paragraph 13. A terminal device according to paragraph 12, wherein the paging message includes an indication of the modification period in which the one or more system information blocks carrying the updated version of the position assistance information are transmitted by the infrastructure equipment.

Paragraph 14. A terminal device according to paragraph 12 or 13, wherein the paging message provides an indication of the one or more system information blocks carrying the updated version of the position assistance information.

Paragraph 15. A terminals device according to paragraph 14, wherein the paging message provides an indication that the position assistance information is invalid, and in response the controller circuitry is configured to detect the one or more system information blocks carrying the updated version of the position assistance information.

Paragraph 16. A terminal device for use in a wireless telecommunications network, the terminal device comprising
  wireless communications receiver circuitry configured to receive signals from the infrastructure equipment via a wireless access interface provided by the infrastructure equipment, the wireless access interface being divided into a plurality of modification periods
  position detection receiver circuitry configured to receive a radio signal from which measurements can be used to assist in determining a position of the terminal device, and
  controller circuitry configured to control the wireless communications receiver circuitry
  to receive position assistance information transmitted from the infrastructure equipment in a broadcast channel, the position assistance information providing information which can be used to assist in determining the position of terminal device, and to cooperate with the position assistance information to generate an estimate of the position of the terminal device from a combination of the position assistance information and the received radio signal, wherein the controller circuitry is configured to detect a paging message indicating that the position assistance information has changed, to determine whether the terminal device is performing a task dependent upon the estimate of the position of the terminal device, and in response to detecting the paging message indicating that the position assistance information has changed to suspend the performing of the task.

Paragraph 17. An infrastructure equipment forming part of a wireless communications network, the infrastructure equipment comprising transceiver circuitry configured to transmit signals to terminal devices communicating via the wireless communications network, the transceiver circuitry transmitting the signals via a wireless access interface provided by the infrastructure equipment, an interface with a location server operatively associated with the wireless communications network and configured to receive from the location server position assistance information for use by one or more terminal devices in determining the position of terminal devices, to transmit one or more system information blocks carrying the position assistance information to the terminal devices, to receive from the location server an indication of a relative risk that the position assistance information will change, to transmit to the terminal devices the indication of the relative risk that the position assistance information will change, and in response to the indication of the relative risk that the position assistance information will change to transit to the one or more terminal devices an indication that the terminal devices should change a discontinuous reception cycle in accordance with the relative risk to make the cycle shorter for a higher relative risk that the position assistance information will change.

Paragraph 18. An infrastructure equipment according to paragraph 17, wherein the discontinuous reception cycle of the one or more terminal devices comprises in a first part of the cycle to detect the one or more system information blocks and during a second part of the cycle reducing a power to receive signals, and the controller circuitry is configured in combination with the transmitter circuitry the indication to adapt a length of the second part of the cycle in accordance with the relative risk to make the second part of the cycle shorter for a higher relative risk that the position information will change.

Paragraph 19. An infrastructure equipment according to any of paragraphs 17 or 18, wherein the controller circuitry is configured with the transmitter circuitry to transmit the indication of the relative risk of the change of the position assistance information to the one or more terminal devices in the one or more system information blocks.

Paragraph 20. An infrastructure equipment according to paragraph 19, wherein the controller circuitry is configured with the transmitter circuitry to transmit updated position assistance information received from the location server to the one or more terminal devices in one or more system information blocks.

Paragraph 21. An infrastructure equipment according to any of paragraphs 17 to 19, wherein the controller circuitry is configured with the transmitter circuitry to transmit a paging message to the one or more terminal devices identifying the one or more system information blocks carrying the updated position assistance information.

Paragraph 22. A location server comprising a position information receiver configured to receive signals from one or more signal emitting devices which are located at predisposed locations, the signals providing an indication of the location of each of the signal emitting devices, controller circuitry configured to generate position assistance information providing the indication of the location of each of the signal emitting devices, and to communicate an indication of the position assistance information through an interface to infrastructure equipment of a wireless communications network for communicating to one or more terminal devices, to determine a relative risk that the position assistance information will change, and to transmit through the interface to infrastructure equipment of the wireless communications network the indication of the relative risk that the position assistance information will change.

Paragraph 23. A location server according to paragraph 22, wherein the controller circuitry configured is configured in combination with the position information receiver to detect that the position assistance information is invalid, and to transmit through the interface to infrastructure equipment of the wireless communications network an alert for communication to the terminal devices that the position assistance information is invalid.

Paragraph 24. A location server according to paragraph 22, wherein the controller circuitry configured is configured in combination with the position information receiver to detect that the position assistance information has changed, and to transmit through the interface to infrastructure equipment of the wireless communications network an indication that the position assistance information has changed for communication to the terminal devices that the position assistance information has changed.

Paragraph 25. A location server according to paragraph 24, wherein the controller circuitry configured is configured in combination with the position information receiver to generate an updated version of the position assistance information in response to detecting that the position assistance information has changed, and to transmit through the interface to infrastructure equipment of the wireless communications network the updated version of the position assistance information.

REFERENCES

[1] 3GPP TS 36 series (LTE) http://www.3gpp.org/DynaReport/36-series.htm
[2] 3GPP TS 38 series (NR) http://www.3gpp.org/DynaReport/38-series.htm
[3] 3GPP TS 36.305: "Stage 2 functional specification of User Equipment (UE) positioning in E-UTRAN"
[4] 3GPP TS 36.355: "Evolved Universal Terrestrial Radio Access (E-UTRA); LTE Positioning Protocol (LPP)"
[5] 3GPP TS 23.271: "Functional stage 2 description of Location Services (LCS)".
[6] OMA Secure User Plane Location (SUPL)
[7] EP17199204

[8] TS 36.331
[9] R2-1710094 (Samsung)
[10] TS 23.828 V8.0.0 (2008-09)
[11] TS 23.042 v9.4.0 (2010-06)

The invention claimed is:

1. A terminal device for use in a wireless telecommunications network, the terminal device comprising:
    wireless communications receiver circuitry configured to receive signals from the infrastructure equipment via a wireless access interface provided by the infrastructure equipment,
    position detection receiver circuitry configured to receive, from a satellite or non-satellite signal emitting device, a radio signal from which measurements can be used to assist in determining a position of the terminal device, and
    controller circuitry configured to
        control the wireless communications receiver circuitry to detect one or more system information blocks carrying position assistance information transmitted from the infrastructure equipment, the position assistance information providing information which can be used to assist in determining the position of terminal device, and
        control the position detection circuitry to estimate the position of the terminal device by combining the identified position assistance information with the radio signal received by the position detection receiver circuitry,
        wherein the controller circuitry is configured with the wireless communications receiver circuitry to
            receive from the infrastructure equipment, prior to the position assistance information changing, an indication of relative risk that the position assistance information will change, and
            prior to the position assistance information changing, and in response to the indication of the relative risk that the position assistance information will change, adapt the receiving of the one or more system information blocks to receive an updated version of the position assistance information in accordance with the relative risk.

2. A terminal device as claimed in claim 1, wherein the indication of the relative risk received from the infrastructure equipment represents an indication of an immediate change of the position assistance information, and the controller circuitry is configured with the receiver circuitry to receive a paging messaging from the infrastructure equipment providing the indication of the immediate change of the position assistance information.

3. A terminal device as claimed in claim 2, wherein the updated version of the position assistance information is provided in the paging message carrying the immediate position assistance information update.

4. A terminals device as claimed in claim 2, wherein the paging message provides an indication that the position assistance information is invalid, and in response the controller circuitry is configured to detect the one or more system information blocks carrying the updated version of the position assistance information.

5. A terminal device according claim 2, wherein the controller circuitry is configured to determine whether the terminal device is performing a task dependent upon the estimate of the location of the terminal device, and in response to receiving the paging message indicating an immediate change to the position assistance information to suspend the performing of the task.

6. A terminal device as claimed in claim 1, wherein the controller circuitry is configured in combination with the wireless communications receiver circuitry to detect the one or more system information blocks carrying the position assistance information in accordance with a discontinuous reception cycle comprising in a first part of the cycle for detecting the one or more system information blocks and a second part of the cycle in which the one or more system information blocks are not detected, and the controller circuitry is configured to adapt one or both of a length of the first and the second parts of the cycle in accordance with the relative risk.

7. A terminal device as claimed in claim 1, wherein the controller circuitry is configured in combination with the wireless communications receiver circuitry in accordance with an indicated first relative risk to detect one or more system information blocks carrying the updated position assistance information by receiving in one of a plurality of modification periods an indication that the one or more system information blocks should be received in a subsequent one of the modification periods and to receive the one or more system information blocks carrying the updated version of the position assistance information in the subsequent one of the modification periods, and in accordance with an indicated second relative risk representing a greater likely of a change in the position assistance information, to adapt the receiving of the one or more system information blocks carrying the updated version of the position assistance information to detect a paging message indicating that the position assistance information has changed and in response to the paging message to detect the one or more system information blocks carrying the updated version of the position assistance information in one of the plurality of modification periods.

8. A terminal device as claimed in claim 7, wherein the paging message includes an indication of the modification period in which the one or more system information blocks carrying the updated version of the position assistance information are transmitted by the infrastructure equipment.

9. A terminal device as claimed in claim 7, wherein the paging message provides an indication of the one or more system information blocks carrying the updated version of the position assistance information.

10. A terminal device as claimed in claim 1, wherein the position detection receiver circuitry is configured to include a plurality of detectors, one of the detectors being configured to detect the radio signal and one or more other detectors for detecting one or more other radio signals which can be used to generate an estimate of a location of the terminal device, and in response to the indication of the relative risk that the position assistance information will change to adapt the position detection receiver to generate the estimate of the location of the terminal device using the one or more other detectors.

11. A terminal device according to claim 1, wherein the controller circuitry is configured to determine whether the terminal device is performing a task dependent upon the estimate of the location of the terminal device, and in response to the indication of the relative risk that the position assistance information will change to suspend the performing of the task.

12. A terminal device as claimed in claim 1, wherein the signal emitting device is a non-satellite signal emitting device provided in an indoor space.

13. A terminal device as claimed in claim 1, wherein the adapting the receiving of the one or more system information blocks to receive the updated version of the position assistance information in accordance with the relative risk includes either switching from a normal mode to an arrangement corresponding to an earthquake and tsunami warning signal (ETWS) communication to read system information (SI) without waiting for a next period of notification change or switching from a relatively long discontinuous reception cycle (DRX) period to a shorter discontinuous reception cycle (DRX) period.

14. A terminal device as claimed in claim 1, wherein the change in the position assistance information is unexpected rather than predetermined.

15. A terminal device for use in a wireless telecommunications network, the terminal device comprising:
    wireless communications receiver circuitry configured to receive signals from the infrastructure equipment via a wireless access interface provided by the infrastructure equipment,
    position detection receiver circuitry configured to receive a radio signal from which measurements can be used to assist in determining a position of the terminal device, and
    controller circuitry configured to
        control the wireless communications receiver circuitry to detect one or more system information blocks carrying position assistance information transmitted from the infrastructure equipment by receiving in one of a plurality of modification periods an indication that the one or more system information blocks should be received in a subsequent one of the modification periods and receive the one or more system information blocks carrying the position assistance information in the subsequent one of the modification periods, the position assistance information providing information which can be used to assist in determining the position of terminal device, and
        detect a paging message indicating that the position assistance information has changed and in response to the paging message detect the one or more system information blocks carrying the updated version of the position assistance information in one of the plurality of modification periods,
    wherein the controller circuitry is configured with the wireless communications receiver circuitry to
        receive from the infrastructure equipment, prior to the position assistance information being changed, an indication of relative risk that the position assistance information will change, and
        prior to the position assistance information being changed, and in response to the indication of the relative risk that the position assistance information will change, adapt the receiving of the one or more system information blocks to receive an updated version of the position assistance information in accordance with the relative risk.

16. A terminal device as claimed in claim 15, wherein the paging message includes an indication of the modification period in which the one or more system information blocks carrying the updated version of the position assistance information are transmitted by the infrastructure equipment.

17. A terminal device as claimed in claim 15, wherein the paging message provides an indication of the one or more system information blocks carrying the updated version of the position assistance information.

18. A terminals device as claimed in claim 17, wherein the paging message provides an indication that the position assistance information is invalid, and in response the controller circuitry is configured to detect the one or more system information blocks carrying the updated version of the position assistance information.

19. A terminal device for use in a wireless telecommunications network, the terminal device comprising:
    wireless communications receiver circuitry configured to receive signals from the infrastructure equipment via a wireless access interface provided by the infrastructure equipment,
    position detection receiver circuitry configured to receive a radio signal from which measurements can be used to assist in determining a position of the terminal device, and
    controller circuitry configured to control the wireless communications receiver circuitry to
    receive position assistance information transmitted from the infrastructure equipment in a broadcast channel, the position assistance information providing information which can be used to assist in determining the position of terminal device, and
    cooperate with the position assistance information to generate an estimate of the position of the terminal device from a combination of the position assistance information and the received radio signal,
    wherein the controller circuitry is configured to
        detect a paging message indicating that the position assistance information has changed,
        determine whether the terminal device is performing a task dependent upon the estimate of the position of the terminal device, and
        in response to detecting the paging message indicating that the position assistance information has changed, suspend the performing of the task, and
    wherein the controller circuitry is configured with the wireless communications receiver circuitry to
        receive from the infrastructure equipment, prior to the position assistance information being changed, an indication of relative risk that the position assistance information will change, and
        prior to the position assistance information being changed, and in response to the indication of the relative risk that the position assistance information will change, adapt the receiving of the one or more system information blocks to receive an updated version of the position assistance information in accordance with the relative risk.

* * * * *